INVENTOR
CLAUDE CATTELAIN

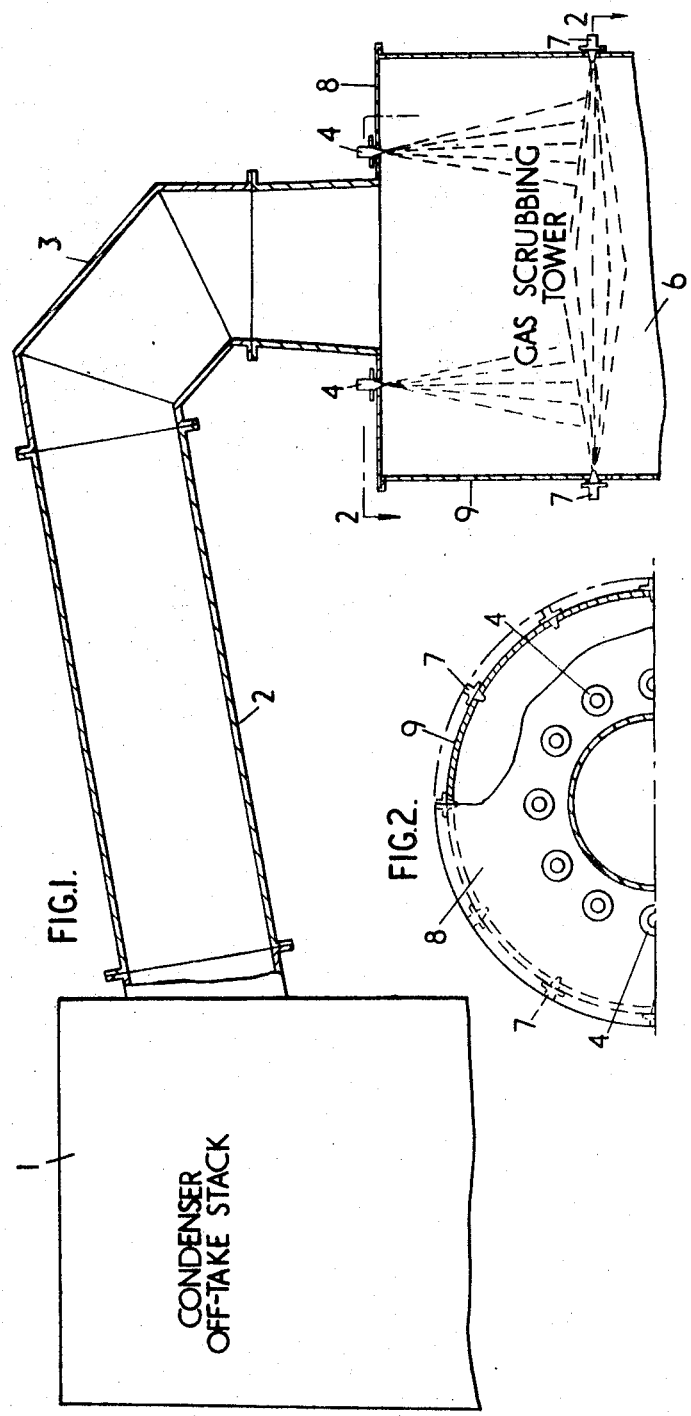

United States Patent Office 3,592,631
Patented July 13, 1971

---

3,592,631
METHOD FOR TREATING ZINC BLAST FURNACE GASES
Claude Cattelain, Douai, France, assignor to Metallurgical Processes Limited, Nassau, Bahamas, and Imperial Smelting Corporation (N.S.C.) Limited, London, England, doing business as Metallurgical Development Company
Filed Apr. 11, 1968, Ser. No. 720,535
Claims priority, application Great Britain, Apr. 25, 1967, 19,004/67
Int. Cl. C22b *19/08*
U.S. Cl. 75—88          2 Claims

ABSTRACT OF THE DISCLOSURE

A dry crossover duct without irrigation means for conveying zinc blast furnace exit gases, connects a condenser with a scrubbing tower, the duct being sloped upwardly towards the scrubbing tower to return liquid metal to the condenser. The scrubbing tower includes sprays for cooling and saturating the gases in space within the scrubbing tower in order to avoid accretion at the end of the duct or tower.

---

This invention relates to a dry crossover duct system, in particular for use in a zinc blast furnace.

This invention applies to any type of zinc blast furnace where zinciferous vapour is formed. For example, when zinc/lead oxidic materials are smelted in a blast furnace, as described in U.S. Patent No. 2,816,022 in accordance with the Imperial Smelting Process, the furnace yields zinc vapour (in admixture with CO, $CO_2$ and permanent gases), lead bullion and slag. The gases containing the zinc vapours are conducted from the top of the furnace to a shock-chilling condenser of the "lead-splash" type as more fully disclosed in U.S. Patent No. 2,464,262. This condenser operates on the principle of passing the zinciferous gases through a shower of molten lead droplets. By careful control of the lead temperature the desired shock cooling of the vapour is achieved, and by combination of the zinc and lead droplets, further re-oxidation of the zinc is precluded. The gases leaving the condenser still contain a small quantity of zinc, lead and some entrained solids and are passed via a duct into a water wash-tower or "scrubbing tower" where the gases are rapidly cooled and saturated by water sprays and the bulk of the residual entrained solids are removed. It is this type of crossover duct system communicating a condenser and a scrubbing tower which is the subject matter of this invention.

Prior practice was to use a crossover duct in the form of a downcomer to link the top of the condenser with the bottom of the scrubbing tower. This crossover duct was irrigated with water to attempt to minimise accretion of lead and zinc oxides. It was necessary to provide cleanout doors and rodding points along the length of this unnecessarily long duct. The 180 degree turn from the top of the condenser to the downcomer took the form of a double crank. The accretion problem was partly due to the two changes in direction of the gas stream in the double crank, but an accretion builds up on any duct or vessel surface when a stream of dirty gas impinges on such a surface in a wet/dry transition zone.

The next stage of development was to shorten the length of the crossover duct and straighten it out. This was accomplished by ducting the gas from the top of the condenser off-take to the top of the scrubber tower, the cleaned gases being removed from the bottom of the scrubbing tower rather than the top, as before. Accordingly, the gas passed concurrently through the scrubbing tower with the scrubbing liquid, as opposed to the more effective countercurrent flow of the prior stage of development. The crossover duct was essentially horizontal, although some bends were incorporated to give access for rodding. The crossover was again irrigated with water to minimise the accretions and of course, sloped downwardly towards the scrubbing tower to prevent any water from draining into the condenser. Accretions were still a problem although the periodic shut-down of the plant to clean out the accretions were not as frequent as before.

The invention consists in a method of conveying zinc blast furnace exit gases from a condenser to a scrubbing tower comprising, passing the gases through a dry crossover duct, and spraying a liquid into the scrubbing tower so that the gases come into contact with the liquid in space within the scrubbing tower.

Preferably once the gases come into contact with the liquid the liquid cools and saturates the gases before the gases come into contact with any surface within the scrubbing tower.

The invention further consists in apparatus for conveying zinc blast-furnace exit gases from a condenser to a scrubbing tower comprising a dry crossover duct connected between the condenser and the scrubbing tower, and means for spraying liquid disposed in the scrubbing tower, said means constructed and arranged so that gases passing into the scrubbing tower initially come into contact with the liquid in space within the scrubbing tower.

In the context of the invention the term "in space" is used to define the place where initial contact between gases and liquid takes place and thereby excludes initial contact at wall surfaces.

The invention will be further explained by way of example with reference to the accompanying drawings:

FIG. 1 shows a front elevation view in section of an embodiment of the apparatus of the invention;

FIG. 2 shows a top view and partial section along line 2—2 of the embodiment shown in FIG. 1;

Figure 3:
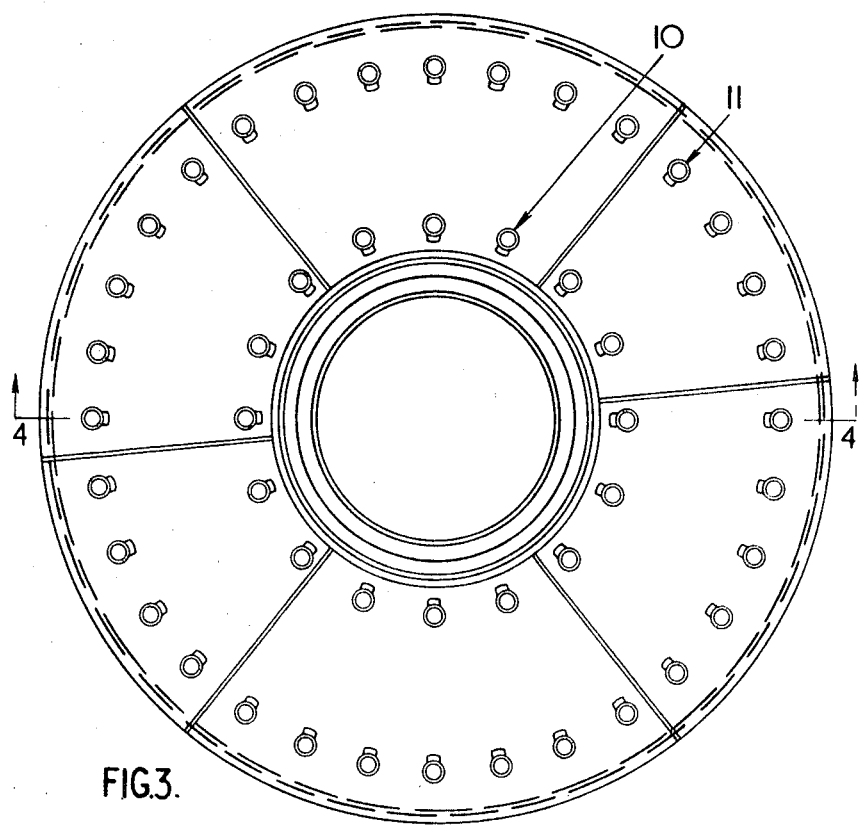
FIG. 3 shows a top view of an alternative embodiment.

The condensor off-take stack 1 is connected to a slightly upwardly sloping crossover duct 2. At point 3 the crossover duct is downwardly directed into the top of the scrubbing tower 6. At the connection of the duct to the tower the duct is directed along the longitudinal axis of the tower. A plurality of coolant spray means 4 are spaced on the top plate 8 and about the entrance of crossover duct into the scrubbing tower 6 forming a circue of spray means. In co-operation with the downwardly directed sprays 4 are a plurality of horizontally directed sprays 7 which are mounted in a circle on the side walls 9 of the gas scrubbing tower which combine with the sprays 4 to form a liquid barrier in the tower to break up the gas flow and improve the efficiency. The scrubbing tower is effectively a continuation of the duct which is terminated by the liquid barrier in the tower. Through this construction the crossover duct 2 remains dry, in other words, there is no irrigation of the duct. The cross-section of the crossover duct is preferably circular but may have other configurations. The crossover duct should have a substantially smooth interior surface. The slope of the crossover duct toward the condenser may be empirically determined. Generally the range is from 7 to 15° upwardly from the horizon, preferably about 12°. The slope serves an additional important function of returning droplets of lead which drop out of the gas in the crossover duct to the condenser. Because the crossover duct is not irrigated, the slope can be toward the condenser and not the scrubbing tower; since there is no longer a problem of water draining into the condenser. Accordingly, it may be necessary to insulate the crossover duct to prevent the solidification of the lead therein.

The essential problem to be solved is how to avoid the hard accretion of lead and zinc oxides at the end of the crossover duct in the wet/dry transition zone which is that portion of the gas conveying apparatus in which the gases come into contact with the liquid. According to the invention, the zone is now created in space by a liquid barrier formed by liquid sprays, preferably water. According to the embodiment of FIG. 1 the sprays 4 are spaced concentrically about crossover duct 2 on the top plate 8, and the sprays 7 are horizontally directed from the tower side walls 9. As the gases enter the scrubbing tower in a stream they are completely shrouded by liquid, cooled and saturated in space before making contact with any surface in the tower. Accordingly, there is no impingement by hot dirty gases on any surface in the wet/dry transition zone to cause accretion.

Although the crossover duct is shown co-axial with the scrubbing tower, any embodiment in which the axis of the crossover duct in parallel to the axis of the scrubbing tower and is spaced far enough away from the side wall of the scrubbing tower to allow complete shrouding of the gas stream by the coolant comes within the scope of the invention. Small variations in the angle at which the duct meets the tower may be permitted but the duct should be substantially vertical at this point.

Figure 4:
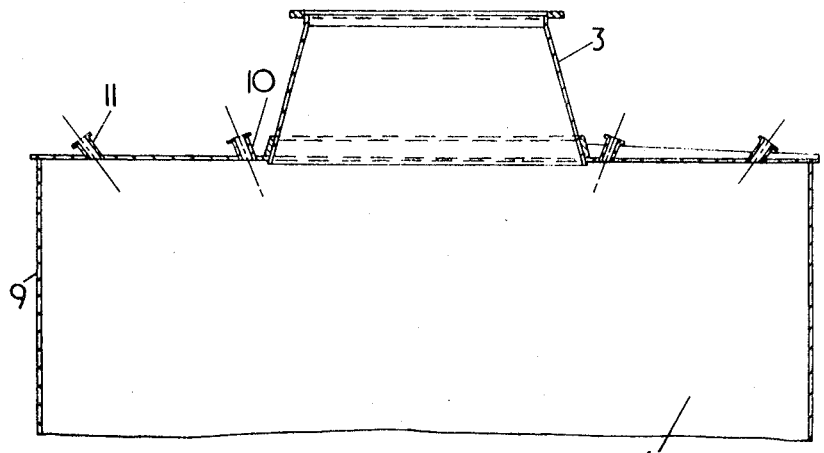
FIG. 4 shows an elevation view in section along the line 4—4 of the embodiment in FIG. 3.

According to the alternative embodiment shown in FIGS. 3 and 4, a first plurality of spray means 10 are disposed on the top plate 8 of the scrubbing tower to form a circle the centre of which coincides with the longitudinal axis of the tower. A second plurality of spray means 11 are also disposed on the top plate 10 of the scrubbing tower and are concentric with the first plurality of spray means and spaced outwardly therefrom.

Similar to the embodiment of FIG. 1 discussed above, the sprayed liquid from the spray means 10 and 11 combine to form a liquid barrier to cool and saturate the liquid in space within the tower. Although only two embodiments of spray means are shown, alternative arrangements of spray meane are possible within the scope of the invention.

An example of the performance of the dry crossover duct system is as follows:

Volume of gas entering duct from condenser off-take stack—670 cu. m./min. NTP
Solids content—(18–30) grams per cu. m.
Actual temperature of gas entering dry crossover duct—450°
Approximate dry analysis of furnace gas:
   CO—18–20%
   $CO_2$—11–13%
   $H_2$—1%
   $N_2$—68%

The nature of the dust in the gas is of a particularly fouling character and containing lead and zinc oxides, a typical range of analyses being;

|  | Percent |
|---|---|
| Pb | 5–15 |
| Zn | 35–45 |
| Cd | 2–3 |
| $SiO_2$ (approx.) | 5 |
| S (approx.) | 3 |

I claim:

1. In a method of recovering zinc from naturally occurring ores in a blast furnace where gases containing zinciferous vapours are withdrawn from the furnace and passed through a shock-chilling condenser and then to a scrubbing tower, the improvement comprising the providing of a dry crossover duct from the top of said condenser and terminating at the top of said tower; passing the gases from said condenser which contain carbon monoxide, nitrogen, carbon dioxide, and entrained solids containing Pb, Zn, Cd, $SiO_2$ and S, which are of a particularly fouling character through said duct to the top of said tower and then immediately into said tower itself; spraying liquid in said toward to completely around the gases as they initially enter said tower to cool and saturate the gases in space so as to effectively preclude impingement of hot dirty gases on any surface in a wet/dry transition zone which causes accretion.

2. A method as claimed in claim 1 wherein the axis of the stream of gases entering the top of said tower is essentially parallel to the axis of said tower and spaced far enough from the side wall of said tower to allow said complete shrouding.

References Cited

UNITED STATES PATENTS

| 1,941,545 | 1/1934 | Eichenberg et al. | 266—31 |
|---|---|---|---|
| 1,994,352 | 3/1935 | Ginder et al. | 75—88 |
| 2,070,101 | 2/1937 | Weaten et al. | 261—123X |
| 2,093,895 | 9/1937 | Mojonnier et al. | 261—117 |
| 2,684,231 | 7/1954 | Pomykala | 261—116X |
| 2,776,881 | 1/1967 | Thomsen | 266—16X |
| 3,388,897 | 6/1968 | Calyaceto | 261—111 |
| 3,406,499 | 10/1968 | Wiemer | 551—230 |

HYLAND BRZOT, Primary Examiner

G. K. WHITE, Assistant Examiner

U.S. Cl. X.R.

266—16, 31